No. 822,177. PATENTED MAY 29, 1906.
E. BARDOU, L. CLERC & B. DESOUCHES.
PROTECTING COVER FOR PNEUMATIC TIRES.
APPLICATION FILED NOV. 14, 1905.

Witnesses.
H. L. Amer.
B. Sommers

Inventors.
Eugène Bardou,
Louis Clerc and
Bernard Desouches.
by Henry Orth Jr. atty.

UNITED STATES PATENT OFFICE.

EUGÈNE BARDOU, LOUIS CLERC, AND BERNARD DESOUCHES, OF PARIS, FRANCE.

PROTECTING-COVER FOR PNEUMATIC TIRES.

No. 822,177.     Specification of Letters Patent.     Patented May 29, 1906.

Application filed November 14, 1905. Serial No. 287,274.

*To all whom it may concern:*

Be it known that we, EUGÈNE BARDOU and LOUIS CLERC, residing at 12 Boulevard Sebastopol, and BERNARD DESOUCHES, residing at 16 Quai de Béthune, Paris, France, citizens of the Republic of France, have invented certain new and useful Improvements in Protecting-Covers for Pneumatic Tires; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The object of our invention is to provide an improved cover capable of protecting the pneumatic tire on a vehicle-wheel, so as to prevent injuries to said tire and avoid skidding.

It consists in attaching onto an annular band made of a supple material, as fabric or leather, a tread formed of vegetal fibers, horsehair, or other fibers twisted into cords of any convenient size, which may then be assembled to make cables, said cords or cables being afterward united together either by entwining or plaiting them or by passing yarns or wires transversely through them.

The cover is provided at its edges with eyelets, hooks, or other means for lacing the cover on the tire and the felly of the wheel or with straps and buckles for the same purpose.

The fibrous pad which constitutes the tread ought to be comparatively narrow—for instance, three inches in width—so as not to form any thickness on the sides likely to hinder the movement of the driving chain or band in the case of motor-cars. It may be thicker at the middle part than at the edges.

By preference such fibrous pad should be soaked in tar-pitch, rubber solution, or some other adhesive material in order, first, to fill the spaces between the cords or cables, and, secondly, to cause the gravel to adhere to this pad, so forming a hardened surface, which nevertheless does not affect the flexibility of the cover.

Figure 1:
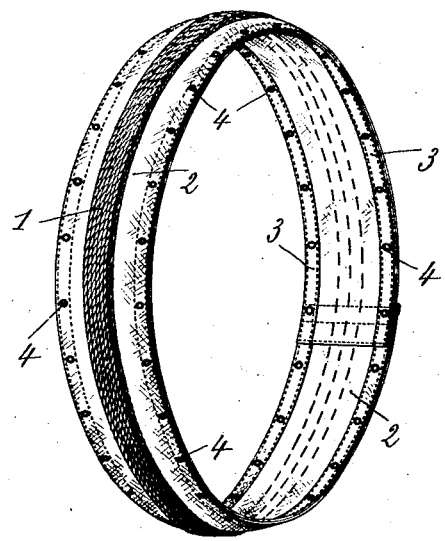
Figure 2:
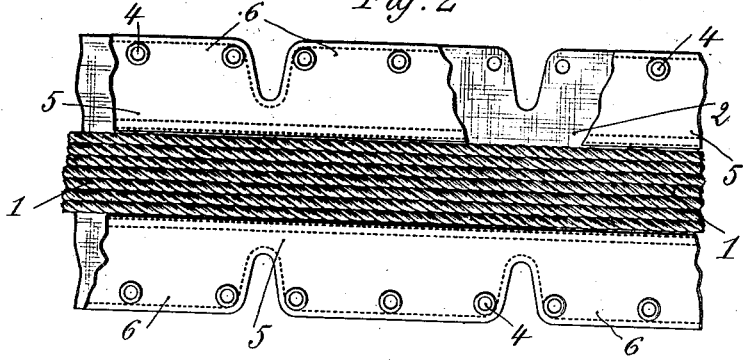
Figure 3:
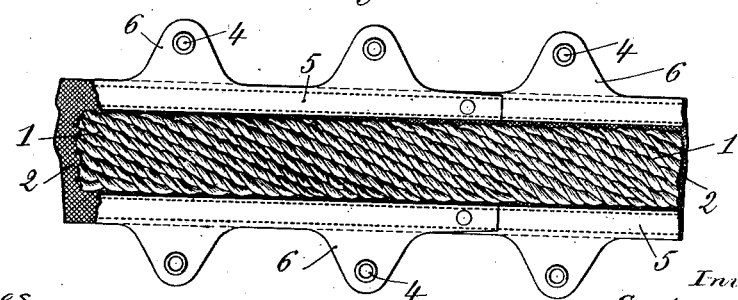

In the drawings, Figure 1 is a perspective view showing our improved cover in position on a tire and wheel. Figs. 2 and 3 are face views showing portions of a cover to illustrate different manners of forming the band or base to which the tread is attached.

On Figs. 1 and 2 the tread 1 is constituted by a flat braid put on the backing or base 2 edgewise and spirally wound around the latter.

On Fig. 3 the tread is made up of cords or braids plaited together, the plait being laid flat on the base.

The tread is attached to the backing 2 either by sewing or by means of rubber solution, or both.

On Fig. 1 the backing 2 consists of a band of a very strong fabric, the two ends of which are connected together by any proper means—for instance, by sewing or riveting. Each edge of this band is strengthened by a strip of fabric or leather 3 and is provided with means to attach the cover on the tire by lacing—as, for instance, with eyelets 4, as shown. By preference the band 2 is curved in cross-section, so as to avoid creases. The band 2 may also be made of lighter fabric and be strengthened by bands of leather 5, extending from each edge thereof to the tread, as shown on Fig. 2. In this case such bands of leather are indented to avoid creases, the eyelets 4 being inserted in the tongues or wide parts 6.

In the modification shown by Fig. 3 the leather tongues 6, in which the eyelets 4 are inserted, are not backed with fabric in order to make the cover still lighter.

Of course the base 2 of the tread might be wholly made of leather or fabric. Also the tongues 6 on the two edges might not be opposite each other.

What we claim as our invention, and desire to secure by Letters Patent, is—

1. A protecting-cover for pneumatic tires composed of a flexible annular base, means for attaching such base on the tire and wheel, and a pad fixed onto said base at the tread and made of fibers twisted into cords which are then united together.

2. A protecting-cover for pneumatic tires composed of a flexible annular base, means for attaching such base on the tire and wheel, and a pad fixed onto said base at the tread and made of fibers twisted into cords which are then united together and coated with an adhesive material.

3. A protecting-cover for pneumatic tires composed of a flexible annular base indented on its edges, means for attaching such base on the tire and wheel, and a pad fixed onto said base at the tread and made of fibers twisted into cords which are then united together.

4. A protecting-cover for pneumatic tires composed of a flexible annular base strengthened at the edges, means on said strengthened edges for attaching such base on the tire and wheel, and a pad fixed onto said base at the tread and made of fibers twisted into cords which are then united together.

5. A protecting-cover for pneumatic tires composed of a flexible annular base, the edges of which are strengthened and formed with indentures between which tongues are left to which eyelets are fixed for attaching such base on the tire and wheel by lacing, and a pad fixed onto said base at the tread and made of fibers twisted into cords which are then united together and coated with an adhesive material.

In testimony that we claim the foregoing as our invention we have signed our names in presence of two subscribing witnesses.

EUGÈNE BARDOU.
LOUIS CLERC.
BERNARD DESOUCHES.

Witnesses:
F. M. CAULDWELL,
ALCIDE FABE.